May 15, 1923.

A. E. SHARPLES 1,455,271

DAMPER CONTROL FOR HEATERS

Filed Jan. 13, 1922      2 Sheets-Sheet 1

Inventor

Arthur E. Sharples

By Howard E. Barlow

Attorney

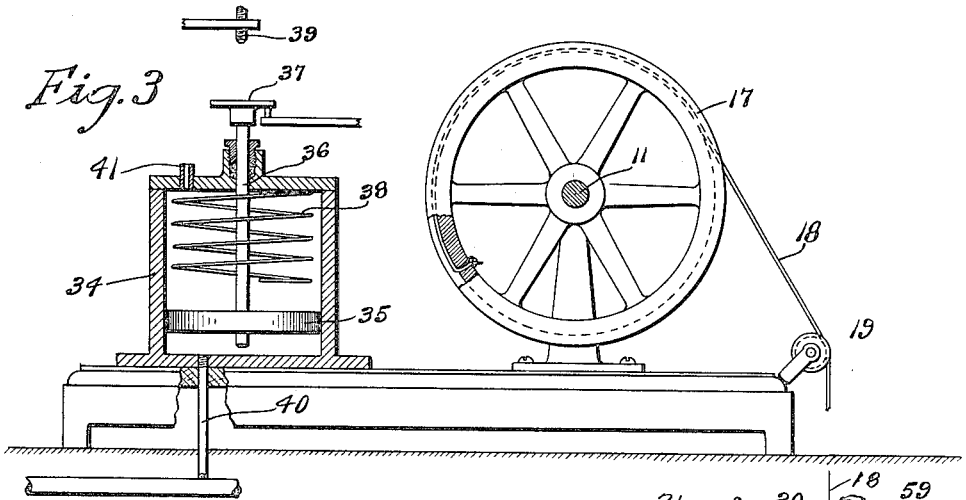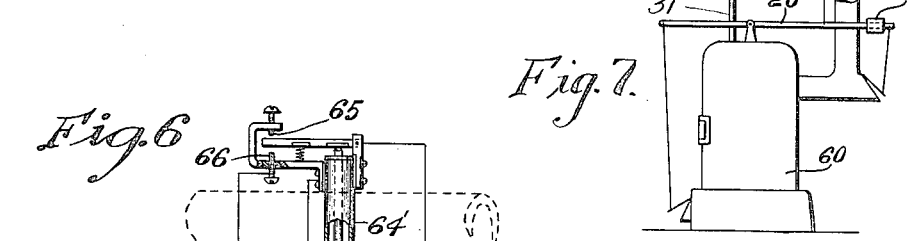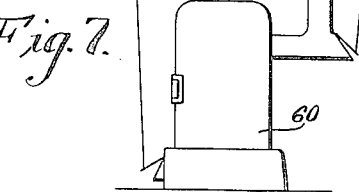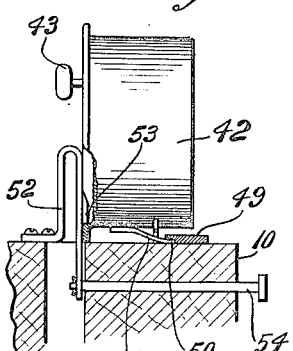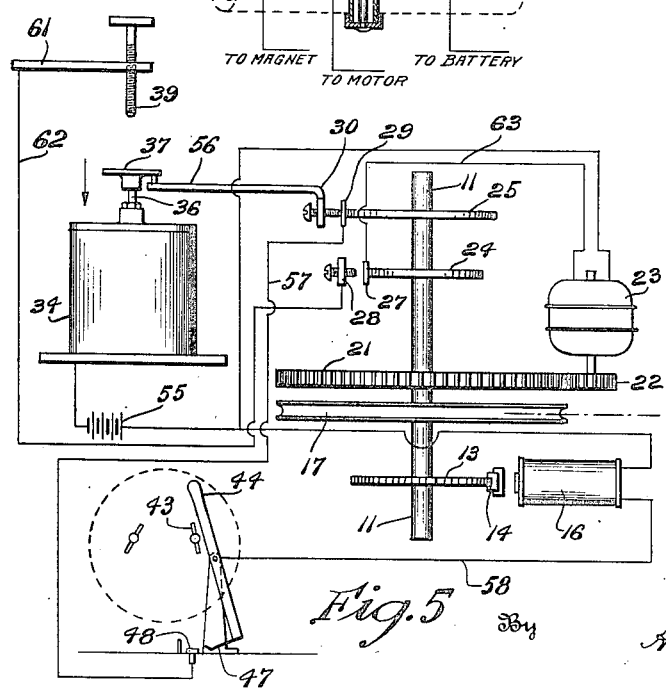

Patented May 15, 1923.

1,455,271

UNITED STATES PATENT OFFICE.

ARTHUR E. SHARPLES, OF PROVIDENCE, RHODE ISLAND.

DAMPER CONTROL FOR HEATERS.

Application filed January 13, 1922. Serial No. 529,067.

*To all whom it may concern:*

Be it known that I, ARTHUR E. SHARPLES, a citizen of the United States, residing at Providence, in the county of Providence and State of Rhode Island, have invented certain new and useful Improvements in Damper Controls for Heaters, of which the following is a specification.

This invention relates to an automatic damper-control for heaters, such for instance as steam, hot-water or hot-air heaters, adapted more particularly for use in residences, and the invention has for its object to provide simple and effective means controlled either by the pressure or by the temperature of the heating medium to close the drafts when a predetermined temperature has been generated in the heater; clock-controlled mechanism being also provided in the electric system for closing the electric circuit at a predetermined time, to open the drafts to obtain more heat.

It is found in practice in heating houses where the drafts for steam heaters are controlled by a diaphragm that a considerable pressure must be generated in the heater in order to affect the action of this diaphragm sufficiently to completely close the drafts and that the pressure of steam required for closing these drafts by action of this diaphragm, is usually considerably greater than is necessary for heating the house, particularly in mild weather, resulting in an unnecessary consumption of fuel by allowing the fire to burn too briskly and for a longer period than is necessary after the radiators have become sufficiently hot.

Then again where a thermostat is acted upon by the temperature of the room, for controlling the drafts it does not operate until the temperature of the whole room has been raised with the result that the fire by that system has been allowed to burn excessively in order to actuate the thermostat and cannot be at once checked after having so raised the temperature. The above difficulties are obviated by the use of my improved automatic damper controlling device which is applied directly to the heating system to be acted upon by either the pressure or the temperature of the heating medium while flowing through the heat-supplying pipes thus checking the drafts before the fire has become too hot, causing it to burn more evenly and with much greater economy than could possibly be the case with either a diaphragm or a thermostat control when the latter is actuated indirectly by the temperature of the room.

With these and other objects in view, the invention consists of certain novel features of construction, as will be more fully described, and particularly pointed out in the appended claims.

In the accompanying drawings:

Figure 3 is a diagrammatic view illustrating the steam cylinder as receiving its operating pressure direct from the main steam pipe of the heater; also showing the winding wheel as positioned to control the action of the heater dampers.

Figure 4 is a side elevation partly in section illustrating the clock which controls the time for opening the drafts and the mechanism for locking the clock to the base.

Figure 5 is a diagrammatic view showing the wiring diagram which controls the operation of the damper-operating mechanism.

Figure 6 is a diagrammatic view illustrating a thermostat as inserted into the heat-supply pipe to be actuated by direct action of the heating medium to control the damper-operating mechanism.

Figure 7 is a side elevation of the furnace on a much reduced scale illustrating the connection of the operating cable thereto.

Figure 1:
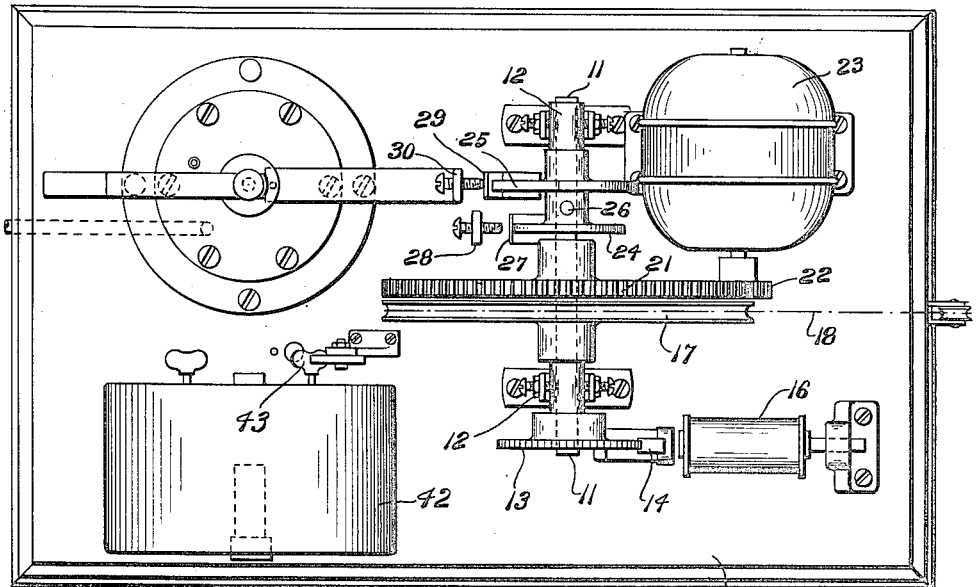
Figure 1 is a plan view of my improved damper-controlling device which is arranged as a unitary system the operating parts of which being shown as mounted upon a single support to be located in any convenient place, either close to or at a point remote from the heater.
Figure 2:
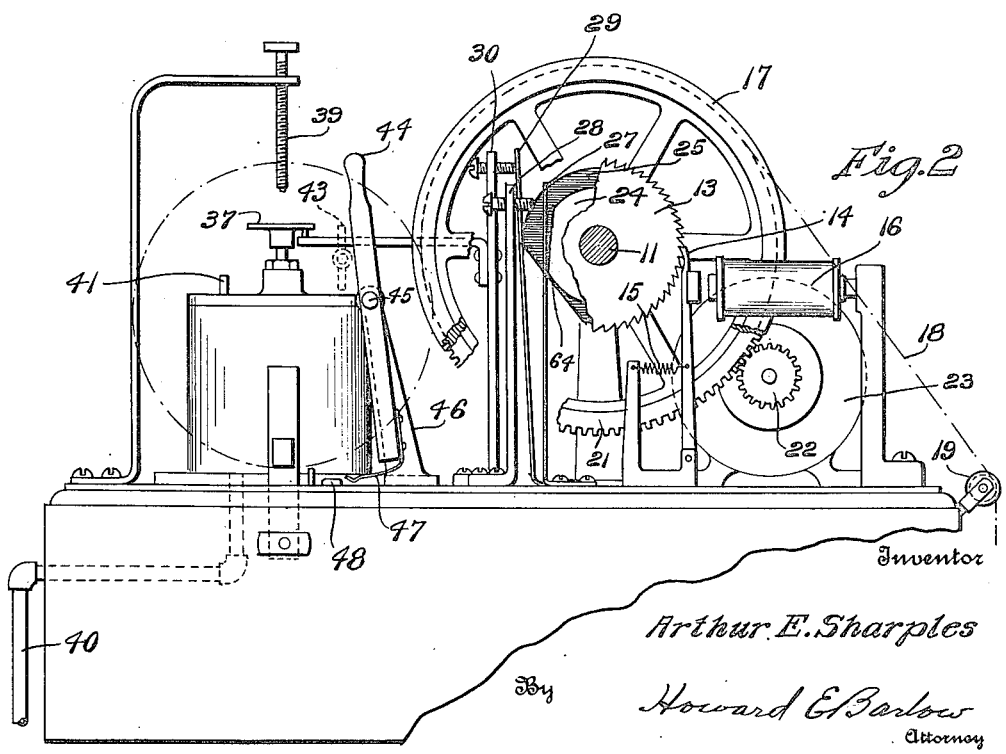
Figure 2 is a side elevation of the control device partly in section and broken away to better illustrate the operating mechanism.

With reference to the drawings, 10 designates the base in which my improved controlling device is mounted. This base may be formed hollow if desired to inclose the wires of the system, and in some cases where an electric current cannot be obtained from an extraneous source the electric battery may be mounted in this base for supplying energy to the motor and magnet, presently described.

On this base I have mounted a shaft 11 in bearings 12,

On one end of this shaft is mounted a ratchet wheel 13 having a pawl 14 normally pressed into engagement with the ratchet by spring 15 and arranged to be drawn from engagement with the ratchet by the magnet 16 when the latter is energized, also on this shaft is mounted a grooved pulley 17 around which is wound a chain or cord 18 that leads over the guide pulley 19 to the damper-control bar 20 below, see Figure 3.

On this shaft is also mounted a large gear 21 which is arranged to be driven through a pinion 22 on the motor 23. Cams 24 and 25 are also mounted on this shaft, the cam 24 being fastened to the shaft by a setscrew 26 whereby it may be adjusted circularly to determine the time for making and breaking the circuit through spring contacts 27 and 28, the cam 25 being adapted to control the opening and closing of the circuit through the contacts 29 and 30.

In order to control the making and breaking of the electric circuits by the steam pressure in the main steam pipe 31, see Figure 3, I have provided a cylinder 34 in which is mounted a piston 35 having a connecting rod 36 on the upper end of which is mounted a contact disk 37.

Within this cylinder I have positioned a coil spring 38 to control or serve as a resistance to the lifting of the piston 35, whereby the greater the pressure in the pipe 31 the higher will be forced the piston in the cylinder against this spring until sufficient pressure has been generated to lift the piston into engagement with the upper contact member 39.

This cylinder is connected directly to the steam pipe by an inlet pipe 40, and a vent pipe 41 is positioned in the cylinder head on the upper side of the piston to permit its free movement therein.

In order to effect the closing of the draft-opening circuit I have provided a clock 42 having a key 43 for winding the spring of the alarm mechanism, which key extends out of the rear of the clock and when the alarm is tripped, this key is caused to rotate and engage the upper end of the lever 44 which is pivoted at 45 to the standard 46 thus causing its lower end which is provided with a spring contact finger 47 to engage the fixed contact 48 to close this circuit, and when it is desired to prevent further action of this controlling mechanism the lever is moved back by hand to open the circuit.

In order to lock this clock in position on the base 10, I have, as illustrated in Figure 4, provided a boss 49, undercut at 50, into which a tongue 51 on the clock is adapted to be passed, and I have also provided a U-shaped spring 52 having a lip 53 adapted to engage a notch in the back of the clock to firmly lock the clock in position on the base. I have also provided a push pin 54 which upon being pressed inwardly will cause the lip 53 to release the back of the clock permitting it to be removed when desired.

The wiring system of this device may be described as follows:—

When the mechanism is in position illustrated in Figure 5 with the piston down and the magnet cam 25 in position to close the magnet circuit, the steam pressure is supposed to be low in the heater. The alarm portion of the clock is now actuated, turning the key-member 43 to the right to throw the lever 44 and complete the circuit from the battery 55 through the cylinder 34, arm 56, contacts 30 and 29, wire 57, contacts 48 and 47 and wire 58 to the magnet 16, the energizing of which withdraws the pawl 14 from engagement with the ratchet permitting the shaft under action of the weight 59 on the damper-bar 20 to rotate the pulley 17 and cause the draft to act upon and drive the fire in the heater 60. This rotating of the shaft 11 through the pulley 17 causes cam 25 to break the circuit by permitting contacts 29 and 30 to separate at the same time rotating cam 24 to close contacts 27 and 28.

As the heat now rises the steam pressure is increased and passes along through the heater pipe 31 and through the supply pipe 40 into the cylinder 34 to act upon and raise the piston 35 against the tension of spring 38 until sufficient pressure has been generated to drive the piston high enough to make connection with the adjustable contact screw 39 in which case an electric circuit is completed from the battery 55 through the cylinder 34 and piston-rod 36 through arm 61 wire 62 through the now closed contacts 27 and 28 and wire 63 to the motor 23 which is energized to rotate shaft 11 through the pinion 22 and gear 21 to wind up the chain or cord 18 on the pulley 17 and so operate the damper-bar to again check the draft. The action of the motor continues until the flattened portion 64 of cam 24 is presented to the contact 27 permitting it to move and separate from the contact 28 thus breaking the circuit and stopping the motor at the same time positioning cam 25 to again close contacts 29 and 30 ready to act upon the magnet 16 to permit the dampers to be again acted upon when the contact plate 37 shall have dropped sufficiently to engage contact arm 56.

This cycle of operations is repeated as often as is necessary to maintain the proper or desired amount of heat in the heating system while the clock circuit is closed and the adjustable contact screw may be regulated to receive the action of the mechanism at any desired range of temperature.

Upon retiring or at any other desired period when it is found desirable to permit the steam pressure to remain low, it is only necessary to move the lever 44 to break the circuit between the contacts 47 and 48 in which case the draft will remain checked and the steam pressure would naturally be so low as not to affect the action of the piston 35, and when it is desired at some predetermined hour, to again stimulate the action of the fire by opening the drafts, the alarm portion of the clock mechanism is set to act at that hour, to throw the lever 34 to complete the circuit to the contacts 47 and 48 to open the drafts and so raise the pressure of the steam to act in the manner above described.

The device is extremely simple and practical in construction and effective in its operation and by applying it in the position to be directly acted upon by the steam in the system the control of the fire in the heater is much better regulated than could possibly be the case if the drafts were controlled by mechanism not so directly affected.

In cases when hot air or hot water is used as a heating medium a thermostat 64' see Figure 6, may be inserted into the heater pipe to be directly affected by the heat thereon so that by expanding a predetermined amount engagement is made with contact 65 to complete the circuit and check the draft and when the temperature falls, engagement is made with contact 66 to complete the circuit and open and close the dampers all through the damper-controlling mechanism above described.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A damper-control for heaters comprising a winding member connected to operate the dampers, an electric circuit including an electric motor for driving said winder in one direction, an electric circuit including a magnet for controlling the movement of the winding member in the other direction, and a steam-actuated piston arranged to control the different electric circuits for operating said motor and magnet when the steam reaches predetermined degrees of low or high pressures.

2. A damper-control for heaters comprising a winding member connected to operate the dampers, an electric circuit having an electric motor for driving said winder in one direction to check the drafts, an electric circuit having a magnet for controlling the movement of the winding member in the other direction to operate the dampers to cause a draft in the heater, and a steam-actuated piston connected to the heater arranged to control the different electric circuits for operating said motor and magnet when the steam reaches predetermined degrees of low or high pressures, a clock, a switch in one of said circuits adapted to be moved to open the circuit and automatically closed by said clock at a predetermined time to complete the circuit to operate the damper winding member.

3. In a heating system, a heater having draft controlling dampers, an electric circuit, a steam actuated piston connected to the heater and arranged to close said circuit and energize a motor to operate the damper to check the drafts when the steam in the heater is raised to a predetermined pressure, and arranged to close another electric circuit to operate a magnet to move said damper to permit a draft to act upon the heater when the pressure falls a predetermined amount, a clock and a switch in one of said circuits adapted to be manually moved to open said circuit and closed by said clock to complete the circuit and permit the said damper controlling mechanism in said circuit to function.

4. A steam heater provided with draft controlling dampers, a cylinder having a connection to the boiler and containing a piston having a piston-rod with electric contact points adapted to complete a draft permitting an electric circuit when the pressure is low and to complete a draft checking electric circuit when the pressure has reached a predetermined amount, the first said circuit including an electromagnet to operate said dampers and the second said circuit including an electric motor to operate said dampers, a manually opened electric switch in the electromagnet circuit, and a clock controller automatically closing said circuit at a predetermined time.

5. A damper-control for heaters comprising a winding member connected to operate the dampers, two electric circuits, a motor and a magnet in said circuits for controlling the movement of said winder to operate the dampers to check and also to cause a draft in the heater, a pair of cam-actuated switches in said circuits positioned by the rotation of said winder to arrest the action of the motor and magnet after each has operated, and a steam-actuated piston also arranged to control said electric circuits for operating said motor and magnet respectively when the steam in the heater reaches predetermined degrees of low and high pressures.

6. A damper-control for heaters comprising a shaft, a pair of switches, a pair of cams on said shaft for controlling said switches, a winding pulley on said shaft operatively connected to the dampers, a motor for driving said shaft and pulley in one direction, a pawl controlled ratchet on said shaft for controlling the return rotation of said pulley, a steam pressure controlled member cooperating with said switches for opening and closing the different circuits to energize said motor to operate the dampers to check the draft and to energize the magnet to permit the operation of the dampers to cause a draft.

7. A damper-control for heaters comprising a shaft, a pair of switches, a pair of cams on said shaft for controlling said switches, a winding pulley on said shaft operatively connected to the dampers, a motor for driving said shaft and pulley in one direction, a pawl controlled ratchet on said shaft for controlling the return rotation of said pulley, a steam pressure controlled piston cooperating with said switches for opening and closing the different circuits to energize said motor to operate the dampers to check the draft and to energize the magnet to permit the operation of the dampers to cause a draft, a clock and a switch adapted to be opened by hand and closed by action of said clock to operate the damper controlling mechanism at a predetermined time.

8. A damper-control for heaters comprising a winding member connected to operate the dampers, two electric circuits, a motor, a magnet in said circuits for controlling the movement of said winder to operate said dampers to control the heater drafts, a pair of cam-actuated switches in said circuits positioned by the rotation of said winder to arrest the action of the motor and magnet after each has functioned, a steam-actuated piston also arranged to control the different electric circuits for operating said motor and magnet when the steam reaches predetermined degrees of low and high pressures, means for automatically closing the circuit to move the dampers to cause a draft, and means for manually opening the circuit to arrest the action of the damper-controlling apparatus when desired.

In testimony whereof I affix my signature.

ARTHUR E. SHARPLES.